United States Patent
Lemkin et al.

(10) Patent No.: US 7,898,322 B1
(45) Date of Patent: Mar. 1, 2011

(54) DEMODULATOR FOR A LOW POWER RADIO RECEIVER

(75) Inventors: Mark Lemkin, Berkeley, CA (US); Brett Warneke, Castro Valley, CA (US)

(73) Assignee: Dust Networks, Inc., Hayward, CA (US)

( * ) Notice: Subject to any disclaimer, the term of this patent is extended or adjusted under 35 U.S.C. 154(b) by 301 days.

(21) Appl. No.: 12/148,411

(22) Filed: Apr. 18, 2008

(51) Int. Cl.
*H03D 3/00* (2006.01)
*H04L 27/14* (2006.01)
*H04L 27/156* (2006.01)
*H04L 27/22* (2006.01)
*H04L 27/233* (2006.01)

(52) U.S. Cl. .......................... 329/302; 329/306; 375/324

(58) Field of Classification Search ......... 329/300–303, 329/315, 323, 341–343; 375/324–328, 334–337; 455/214, 337
See application file for complete search history.

(56) References Cited

U.S. PATENT DOCUMENTS

| | | | | |
|---|---|---|---|---|
| 4,011,511 A | * | 3/1977 | Chang | 375/337 |
| 4,144,414 A | * | 3/1979 | Nicholas | 370/507 |
| 5,414,736 A | * | 5/1995 | Hasegawa et al. | 375/334 |
| 5,717,721 A | * | 2/1998 | Kawai | 375/326 |
| 6,188,733 B1 | * | 2/2001 | Kawai | 375/334 |

OTHER PUBLICATIONS

Mine Kalkan, Feza Kerestecïoğlu; *Zero-Crossing Based Demodulation of Minimum Shift Keying*; Turk J Elec Engin; vol. 11, No. 2; 2003; © Tübïtak; İstanbul-Turkey, p. 75-94.

* cited by examiner

*Primary Examiner*—David Mis
(74) *Attorney, Agent, or Firm*—Van Pelt, Yi & James LLP

(57) ABSTRACT

Frequency demodulation of a signal is disclosed. A first edge event and a second edge event are detected in a signal. The second edge event is an edge event subsequent in time to the first edge event. A data bit based at least in part on a timing interval between the first edge event and the second edge event is determined.

41 Claims, 11 Drawing Sheets

DEMODULATOR FOR A LOW POWER RADIO RECEIVER

BACKGROUND OF THE INVENTION

MSK and FSK modulation are both constant-envelope modulation, meaning that the data contained in the signal is not reflected in variations in amplitude. Phase modulation may also be thought of as frequency modulated data, since phase and frequency are related to each other by either an integration operation or a differentiation operation. In fact, it is well known that OQPSK with half-sine pulse shaping is equivalent to MSK modulation. OQPSK with half-sine pulse shaping is the modulation technique called out in the IEEE (Institute for Electrical and Electronics Engineers) 802.15.4 standard, which is an IEEE standard applicable to low power radio networks. It would be beneficial to have a radio that would be 802.15.4 standards compliant as well as consume a very low amount of power when receiving data. To date, all existing radio solutions on the market are high powered devices, typically drawing more than 15 mA. Many commercially available radios draw 30 mA or more. One reason for the high power consumption of many existing 802.15.4 radios is that their receiver demodulators have power hungry blocks such as high-speed analog to digital converters that are used for signal demodulation.

BRIEF DESCRIPTION OF THE DRAWINGS

Various embodiments of the invention are disclosed in the following detailed description and the accompanying drawings.

DETAILED DESCRIPTION

Figure 1:
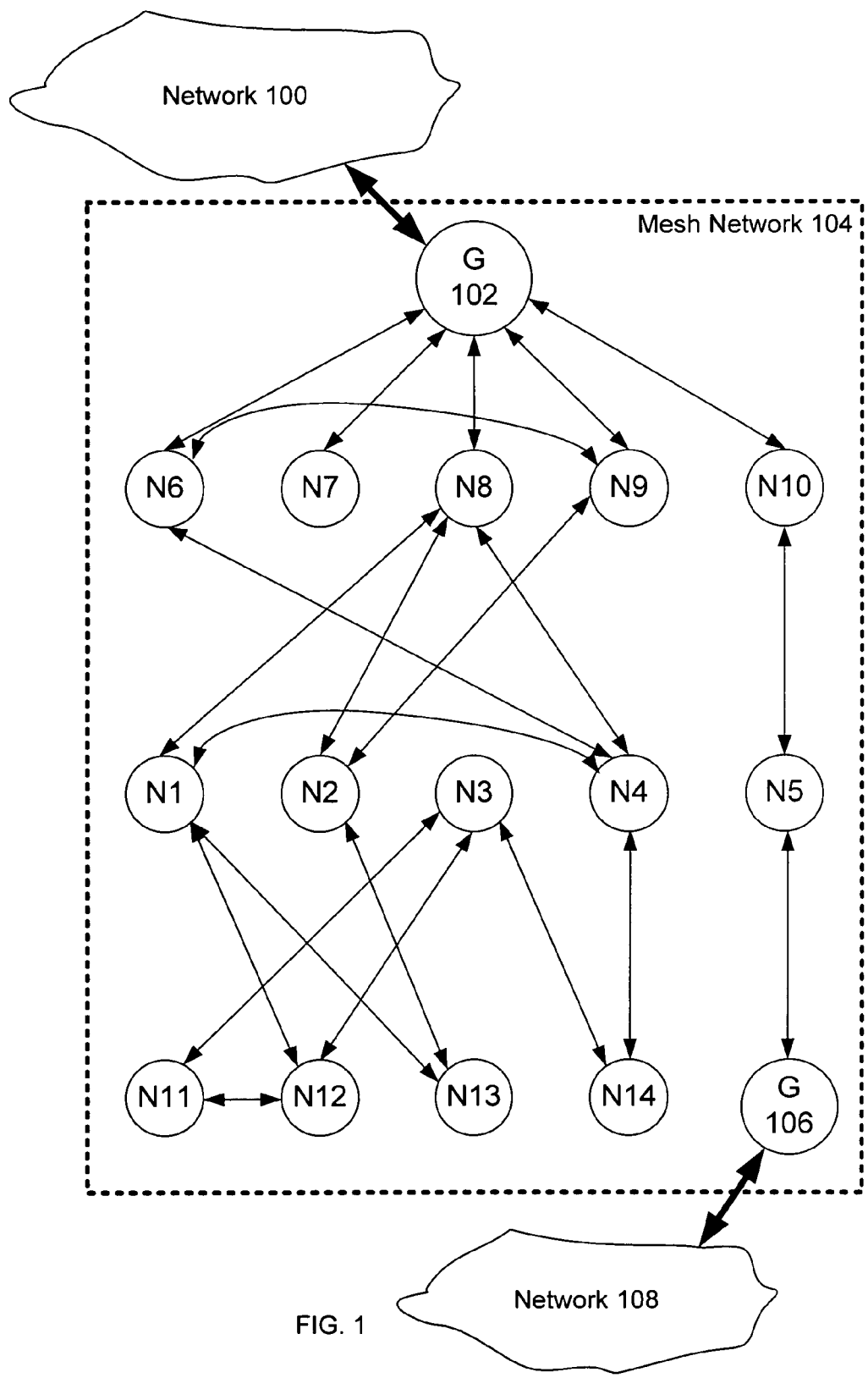
FIG. 1 is a block diagram illustrating an embodiment of a mesh network.

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A demodulator for a low power radio receiver is disclosed. By using a mostly digital demodulator, low power demodulation is achieved. In some embodiments, a frequency-modulated radio signal is received by an antenna as part of a wireless mesh network node. By mixing the radio signal with a local oscillator, the radio signal is converted to a signal at lower frequency, but with the same frequency deviations. In some embodiments, the signal is compared to a reference level, which it crosses twice each oscillation. The time intervals between these reference-crossings are used as a measure of the instantaneous frequency. In some embodiments, the signal is differential and is checked for zero crossings of the differential signal. The time intervals between these zero crossings are used as a measure of the instantaneous frequency. In some embodiments, the frequency signal is filtered. The frequency signal is compared to a threshold to recover the original binary data. Transitions in the frequency signal are used to generate a data clock.

The demodulator comprises a frequency detector, which converts a frequency-modulated signal into a frequency signal. In various embodiments, the frequency-modulated signal comprises a frequency-shift keyed (FSK) signal; a Gaussian Frequency-Shift Keyed (GFSK) signal; a minimum shift keyed (MSK) signal; an Offset Quadrature Phase Shift Keyed (OQPSK) signal; an Offset Quadrature Phase Shift Keyed with half-sine pulse shaping, or any other appropriate signal that can be demodulated using a frequency detector. In some embodiments, the frequency-modulation has two values such as binary frequency shift keying. In some embodiments, the frequency-modulation has four or more values such as 4-FSK.

The frequency signal is a digital signal whose value is correlated to the instantaneous frequency of the frequency-modulated signal. In some embodiments, the frequency detector uses a counter, driven by a high-speed clock, to measure the intervals between transitions in the frequency-modulated signal. In various embodiments, the frequency detector counts the number of clock cycles in each full, half period, or any other appropriate period of the frequency-modulated signal frequency signal drive.

FIG. 1 is a block diagram illustrating an embodiment of a mesh network. In the example shown, mesh network 104 can communicate with network 100 and/or network 108. Network 100 and network 108 comprise communication networks. In various embodiments, network 100 and/or network 108 comprise(s) a local area network, a wide area network, the Internet, a wired network, a wireless network, or any other appropriate communication network. Mesh network 104 includes gateway nodes and mesh network nodes. Gateway nodes are represented in FIG. 1 as G 102 and G 106. The gateway nodes are able to communicate directly with a network—for example, network 100 and network 108, respectively—and with mesh network nodes. For example, G 102 is able to directly communicate with N6, N7, N8, N9, and N10. In some embodiments, the gateway node acts as a mesh network coordinator sending to and receiving from the mesh network nodes information, configuration, status updates, etc. In some embodiments, there are multiple gateway nodes that can communicate with the same network (e.g., network 100) or one or more different networks. Mesh network nodes are represented in FIG. 1 as N1-N14. A mesh network node can communicate with other mesh network nodes and gateway nodes. In some embodiments, mesh network nodes are sensor or device mesh network nodes. For example, mesh network node N5 is able to communicate directly with mesh network node N10 and with gateway node G 106. In various embodiments, the connections allow communication only in one direction (i.e., to a node or from a node) or in both directions (i.e., both to and from a node).

In the example shown in FIG. 1, gateway and mesh network nodes communicate via radio transmitters and receivers using a packet. In various embodiments, a packet includes a header section and a data section. In various embodiments, the packet header includes information regarding packet type, time sent, source node, destination node, associated frame, node health, number of tries for a hop, number of hops, etc. The packets are sent during defined time slots on defined frequencies using a time division multiple access (TDMA) methodology.

Figure 2:
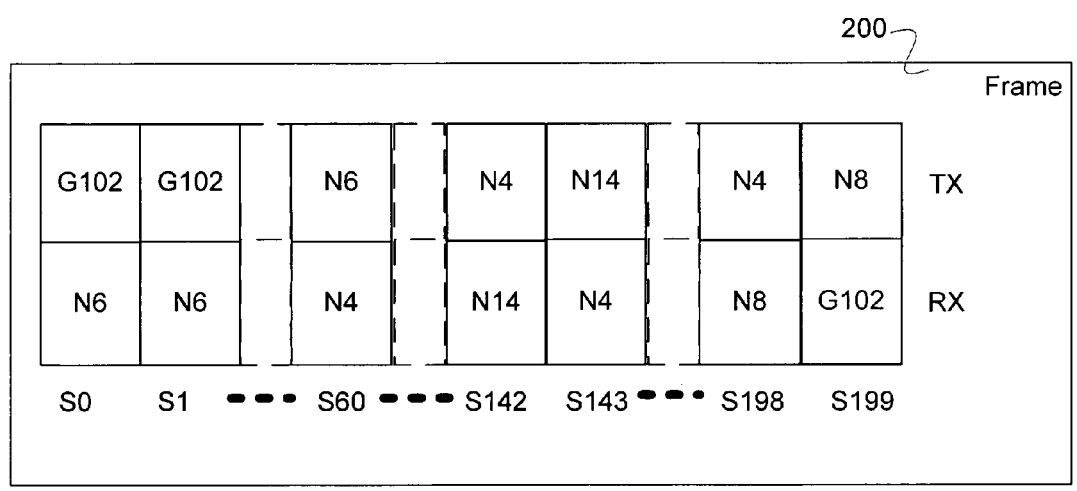
FIG. 2 is a block diagram illustrating an embodiment of a frame.

FIG. 2 is a block diagram illustrating an embodiment of a frame. In the example shown, frame 200 includes time slots that are used to designate a receiver and transmitter. During the time slot a designated transmitter node transmits to a designated receiver node of a mesh network. In various embodiments, the frequency used for transmission and reception is fixed, is selected from a pool of frequencies, rotates in a fixed manner, is randomly assigned, or any other appropriate manner of assigning frequency to a transmission and reception. In various embodiments, the frequency comprises a frequency in the industrial, scientific, and medical (ISM) radio band from 902 MHz to 928 MHz, or the ISM band from 2.4 GHz to 2.4835 GHz. Frame 200 is repeated after executing the transmissions/receptions for all of its time slots. The network can support several different frames either running at different times or running concurrently. Some frames have only a few slots some have many slots depending on their design. Frame 200 contains 200 time slots (represented by S0, S1, S60, S142, S143, S198, and S199). Transmission links in the mesh network are assigned cells in a frame during which then can communicate. The transmissions and receptions for the frame are represented by designating a transmitter and a receiver for a given time slot. In S0 and S1, gateway G102 sends to node N6. In S60, node N6 sends to node N4. In S142, node N4 sends to node N14. In S143, node N14 sends to node N4. In S198, node N4 sends to node N8. In S199, node N8 sends to gateway G102. In some embodiments, the frame is developed by a gateway or managing node during setup or acquisition of nodes in the mesh network. In various embodiments, slots include one-to-one communication relationships wherein one node broadcasts to a single node; one-to-many communication relationships wherein one node broadcasts to a plurality of nodes; many-to-one communication relationships wherein one of a selected set of nodes may transmit to a single node; and many-to-many communication relationships wherein one of a selected set of nodes may transmit to a plurality of nodes.

Figure 3:
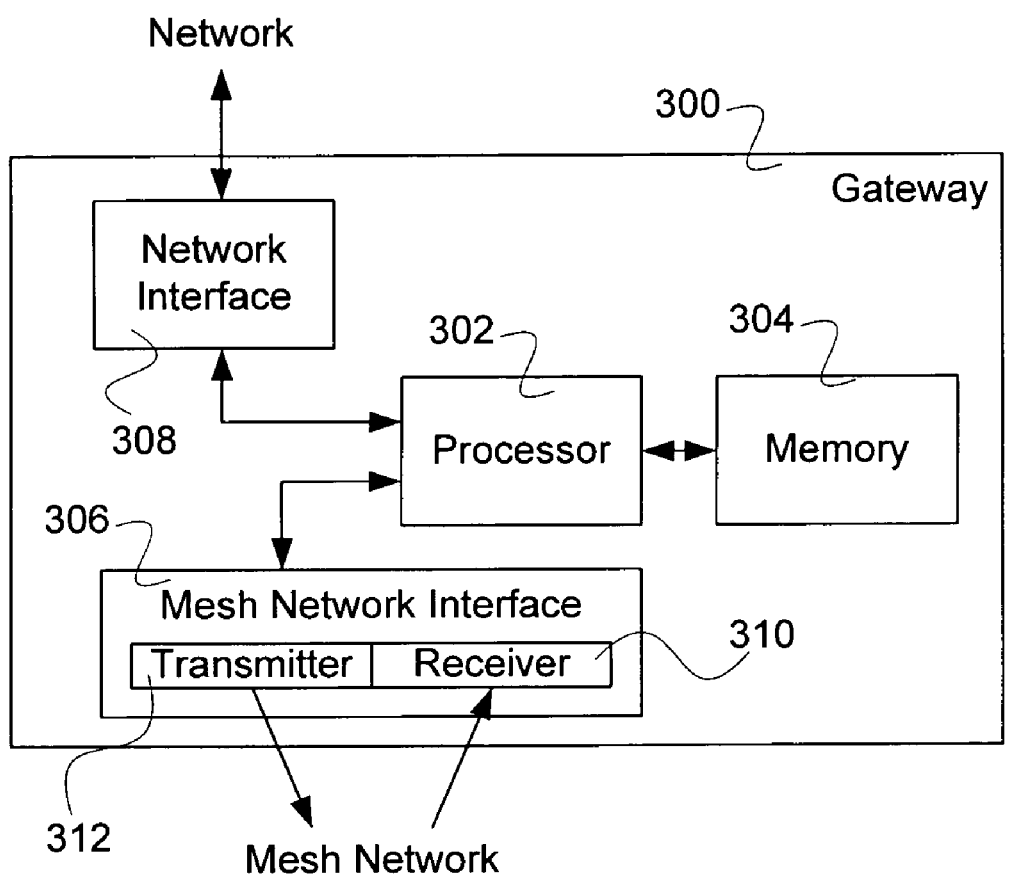
FIG. 3 is a block diagram illustrating an embodiment of a gateway of a mesh network.

FIG. 3 is a block diagram illustrating an embodiment of a gateway of a mesh network. In some embodiments, the gateway 300 of FIG. 3 is used to implement G 102 and/or G 106 in FIG. 1. In the example shown, gateway 300 includes processor 302, memory 304, mesh network interface 306, and network interface 308. Processor 302 runs software that when executed manages the mesh network. Management of the mesh network can include network setup, adding nodes, removing nodes, adding frames to the network, removing frames, monitoring status, optimizing network performance by reconfiguring frames, time synchronization, and/or any other appropriate network management function. Memory 304 provides storage for processor 302 including run-time storage and instruction storage. Mesh network interface 306 includes receiver 310 and transmitter 312. Receiver 310 receives communications in the form of packets transmitted from the mesh network. Transmitter 312 transmits communications in the form of packets to the mesh network. Network interface 308 communicates with a communication network comprising of one or more devices. Information from the mesh network is passed directly to or processed by gateway 300 using processor 302 before passing to the communication network. In some embodiments, gateway 300 is line powered so that power limitations due to finite battery reserves are not an issue. In various embodiments, network management is accomplished by a remote application or is coordinated by a node in the network.

Figure 4:
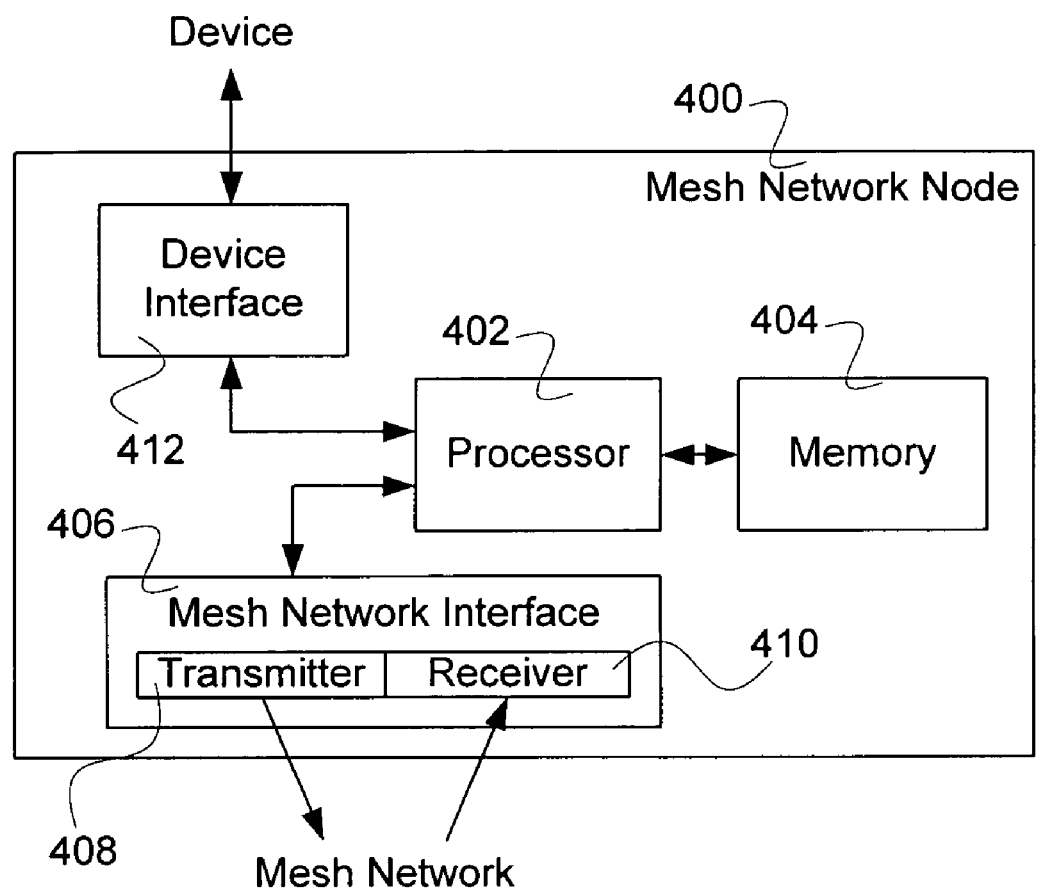
FIG. 4 is a block diagram illustrating an embodiment of a mesh network node of a mesh network.

FIG. 4 is a block diagram illustrating an embodiment of a mesh network node of a mesh network. In some embodiments, the mesh network node 400 of FIG. 4 is used to implement nodes N1-N14 in FIG. 1. In the example shown, mesh network node 400 includes processor 402, memory 404, mesh network interface 406, and device interface 412. Processor 402 runs software that when executed operates the mesh network node. Operation of the mesh network node includes setup, receiving messages, transmitting messages, adding capacity, removing capacity, providing status reports to a gateway manager such as gateway 300 in FIG. 3, time synchronization, and/or any other appropriate operating function. Memory 404 provides storage for processor 402 including run-time storage and instruction storage. Mesh network interface 406 includes receiver 410 and transmitter 408. Receiver 410 receives communications in the form of packets transmitted from the mesh network. Transmitter 408 transmits communications in the form of packets to the mesh network. In some embodiments, mesh network node 400 is battery powered so that power limitations due to finite battery reserves are an issue. Device interface 412 communicates with a device and/or sensor. Device and/or sensor types that can be connected to mesh network node include temperature sensors, strain sensors, image sensors, vibration sensors, fluid level sensors, chemical sensors, gas sensors, radiation detectors, position sensors, acceleration sensors, inclination sensors, shock sensors, infrared sensors, sound sensors, current sensors, voltage sensors, switching device, actuator device, or any other appropriate device and/or sensor. Information to/from the sensor and/or device is passed directly to or processed by sensor mesh network node 400 using processor 402 before passing from/to the mesh network. In some embodiments, mesh network node 400 is compatible with IEEE standard 802.15.4. IEEE 802.15.4 standard relates to low rate wireless personal area networks.

Figure 5:
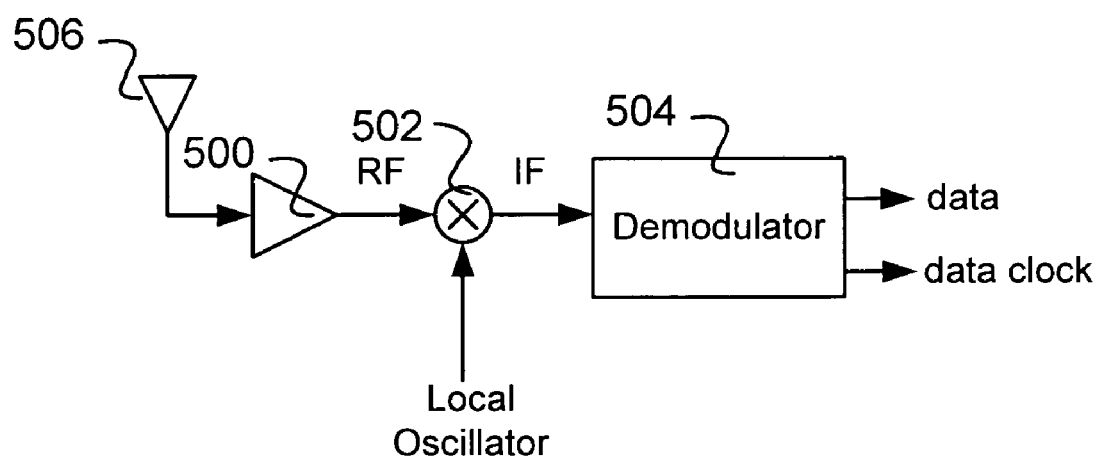
FIG. 5 is a block diagram illustrating an embodiment of a radio receiver that includes a frequency demodulator.

FIG. 5 is a block diagram illustrating an embodiment of a radio receiver that includes a frequency demodulator. In some embodiments, the radio receiver of FIG. 5 is used to implement 410 of FIG. 4 and/or 310 of FIG. 3. In the example shown, a radio signal is received by antenna 506 and amplified by low noise amplifier 500 to create an RF signal. A mixer 502 in combination with a local oscillator converts the RF signal into an intermediate frequency (IF) signal. The IF signal is converted by demodulator 504 into a stream of binary data and a clock.

Figure 6:
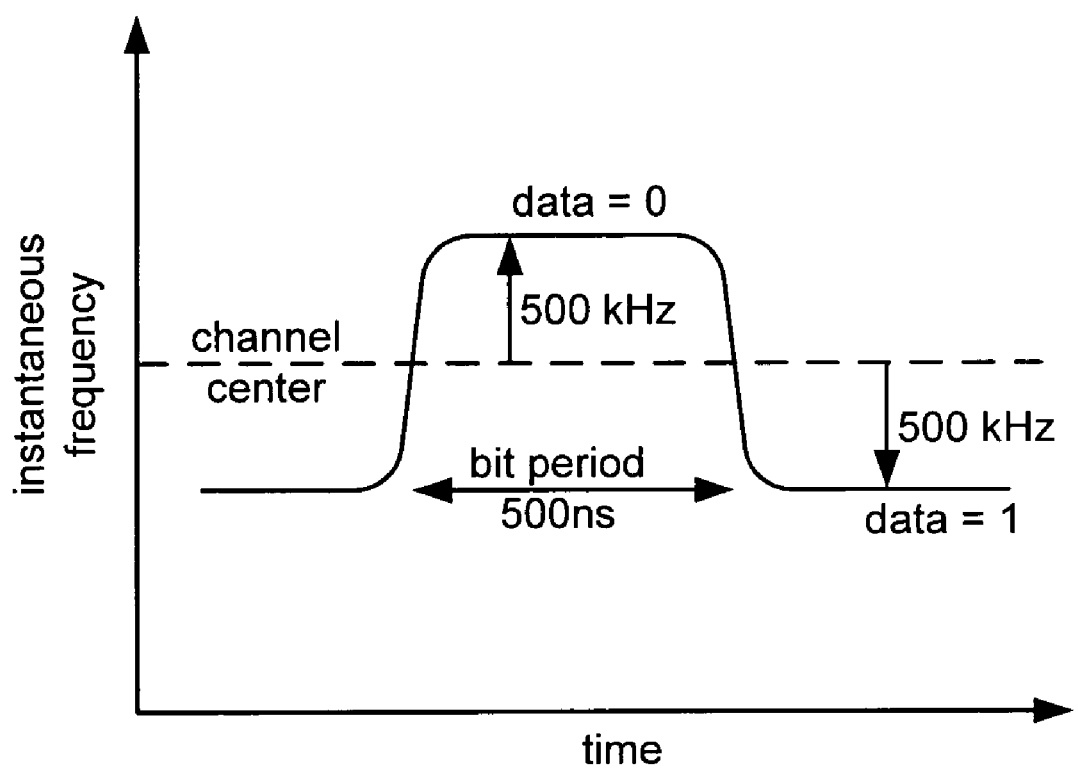
FIG. 6 is a plot illustrating the instantaneous frequency of a frequency-modulated signal carrying binary data, in one embodiment.

FIG. 6 is a plot illustrating the instantaneous frequency of a frequency-modulated signal carrying binary data in one embodiment. In some embodiments, the signal plotted in FIG. 6 represents an instantaneous frequency of the IF signal of FIG. 5 or the RF signal of FIG. 5, and the data values 0 and 1 are the data being transmitted by mesh network interface 406 of FIG. 4. In the example shown, the center frequency is 2.5 MHz and the chip rate (i.e., how often the data can change) is 2 Million chips per second (Mcps), corresponding to a chip period of 500 ns. While a '0' is transmitted, the frequency increases to 3.0 MHz; and while a '1' is transmitted, the frequency decreases to 2.0 MHz. In some embodiments, '0' corresponds to a decrease in frequency and '1' corresponds to an increase in frequency.

Figure 7A:
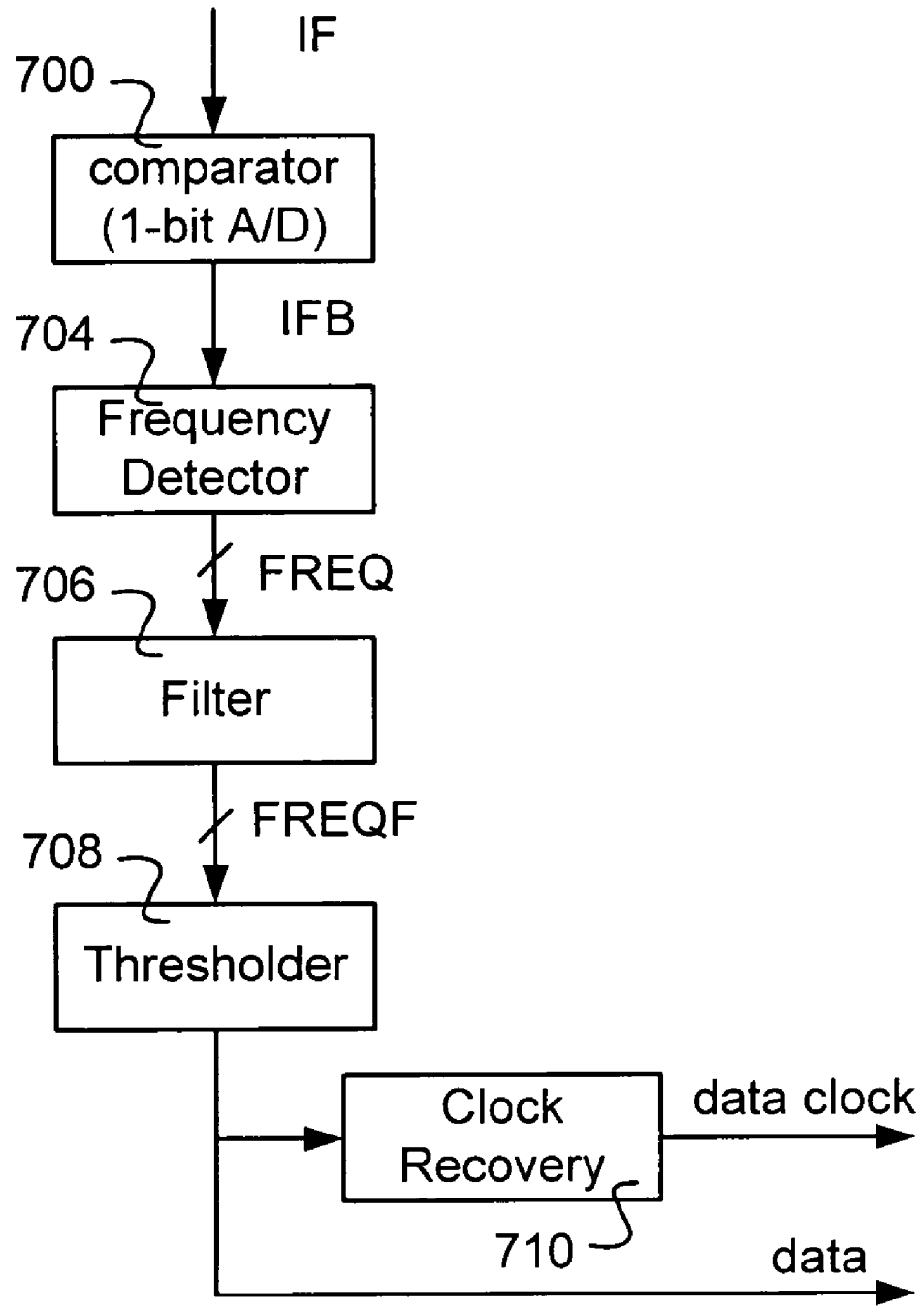
FIG. 7A is a block diagram illustrating an embodiment of a low power frequency demodulator.

FIG. 7A is a block diagram illustrating an embodiment of a low power frequency demodulator. In some embodiments, the frequency demodulator of FIG. 7A is used to implement 504 of FIG. 5. In the example shown, an input analog signal IF is converted to a digital signal IFB by comparator 700. IFB is input to frequency detector 704 which generates a multi-bit digital output signal FREQ, where each multi-bit digital output corresponds to the frequency of the input signal determined by measuring the time between recent transitions of the input IFB. FREQ is then input to digital filter 706, which generates a smoothed version of the input signal FREQF. In some embodiments, digital filter 706 is not present and an output of frequency detector 704 is directly coupled to an input of thresholder 708. Thresholder 708 outputs the binary signal 'data' based on whether FREQF is above or below a threshold value. The output of thresholder 708 is also input to clock recovery circuit 710, which generates a data clock. In some embodiments, thresholder 708 outputs a multi-bit signal by comparing where the value of FREQF falls between a plurality of threshold values, (e.g. 2 bits when the frequency-modulated signal is 4-FSK).

Figure 7B:
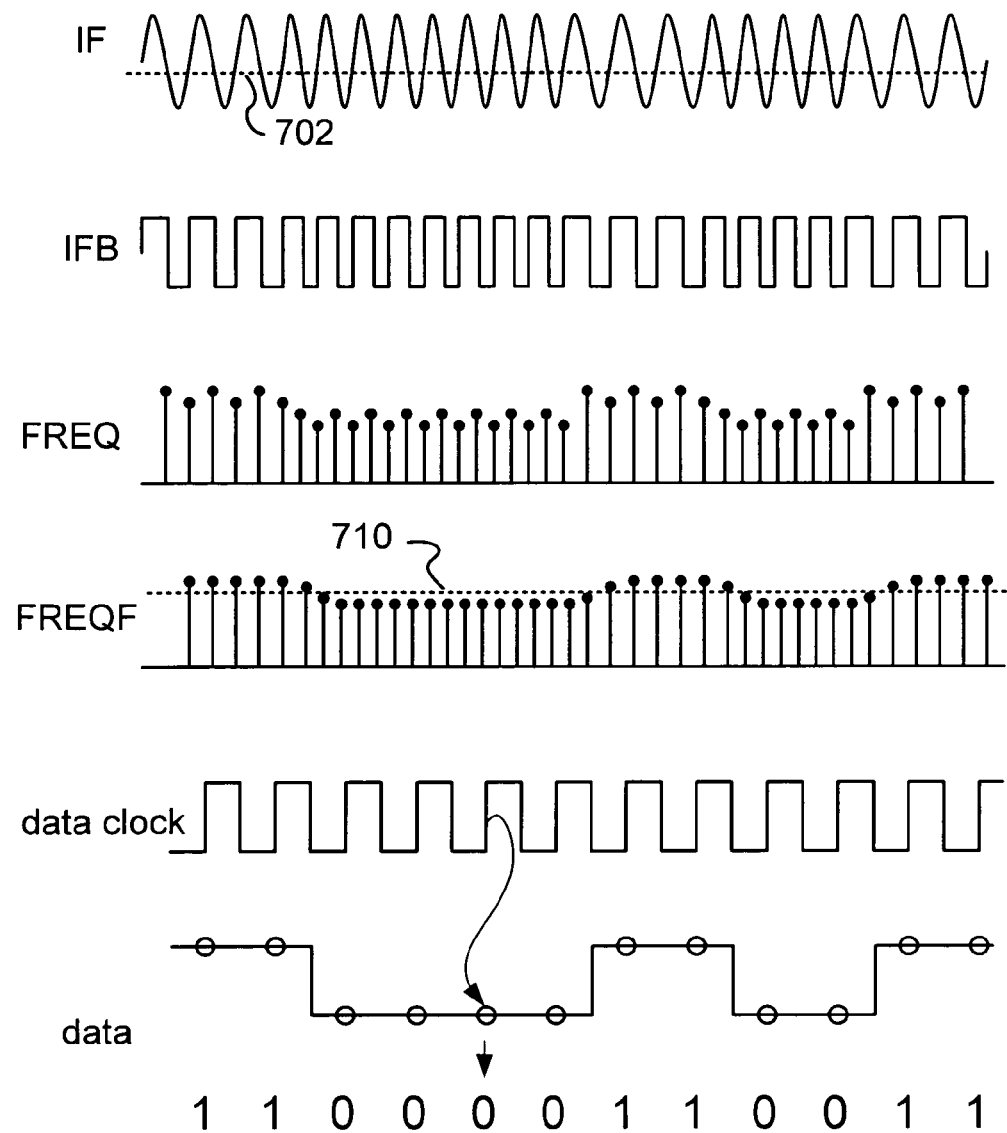
FIG. 7B is a diagram illustrating example signals within the low power frequency demodulator in one embodiment.

FIG. 7B is a diagram illustrating example signals within the low power frequency demodulator in one embodiment. In some embodiments, the signals shown correspond to those named in FIG. 7A. In the example shown, comparator 700 uses voltage reference 702 to convert IF into the binary signal IFB. Dual-edged frequency detector 704 uses high-speed counters to measure the time between transitions in IFB and outputs this information as the multi-bit signal FREQ. While IF is lower than the center frequency, the times between transitions are longer, resulting in higher FREQ values. Conversely, when IF is higher than the center frequency, FREQ is lower. The high-speed counters are clocked by a high-speed clock running at rate that has a sufficiently high frequency to yield sufficient temporal resolution so that frequency modulation may be properly detected by the frequency detector. In some embodiments, the high-speed counters are clocked by a high speed clock running in excess of 100 MHz to provide accurate temporal resolution. In various embodiments, a high speed clock is generated by dividing down a local oscillator used for converting an RF signal to an IF signal; a high speed clock is generated by multiplying up a reference frequency from a crystal oscillator using a phase-locked loop; a high speed clock is generated by a ring oscillator; a high speed clock is generated by a quartz crystal oscillator operating at an overtone of a crystal resonant frequency; or, any other suitable method of generating a high speed clock.

In some embodiments, the IF signal is a differential analog signal represented by $IF_{pos}$ and $IF_{neg}$. In this case, a differential comparator compares the relative polarity of $IF_{pos}$ and $IF_{neg}$, and converts this differential IF signal into the binary signal IFB. Further, a separate reference voltage 702 is not needed as the quantization is performed by comparing the relative values of $IF_{pos}$ and $IF_{neg}$; common mode is largely rejected.

An offset or slowly-varying error may be present in reference 702 (when present), or in the IF signal. These errors may come from mismatch or flicker noise for example in the receiver path, the comparator, any channel select filters included after the mixer and before the demodulator, or in the circuits used to gate the high speed counter. Furthermore, there may be other sources of asymmetry in the dual-edged frequency detector due to differences between rise and fall times. These sources of error may translate to a non-50% duty cycle in IFB when IF is unmodulated and at the center frequency. Variations in duty cycle translate to a large frequency measurement error. For example, if the full periods of IF each have a duration of 100 counts of a high-speed counter, but IFB had a duty cycle of 65%, then the FREQ values would alternate between 65 (during the high intervals of the cycle) and 35 (during the low intervals). This error is overlayed on the real frequency variation, as depicted in FREQ in FIG. 7B. The noise in FREQ could cause a bit to be incorrectly decoded. Such errors degrade receiver sensitivity, because duty cycle variations tend to arise when the amplitude of the RF signal is small. While a frequency detector that provides a new frequency measurement once a cycle by measuring the time between like-signed edges is substantially more immune to duty cycle errors, this type of frequency detector provides an update rate half of a dual-edged frequency detector, making demodulation of low modulation index signals more difficult.

A solution to the duty cycle-induced noise is to use a filter to smooth out the sample-to-sample fluctuations in FREQ to produce a new signal FREQF. A well-designed filter has the advantage of averaging out the effect due to non-50% duty cycle while maintaining the same maximum data rate from the frequency detector. One class of filters that works very well and is easily implemented in CMOS hardware is a sinc filter having a finite-impulse-response. For example: a first order sinc filter with coefficients equal to {0.5, 0.5}, or a second order sinc filter with coefficients equal to {0.25, 0.5, 0.25}. The first filter may be implemented by adding the present and previous value frequency measurements and right shifting by one bit. The second filter may be implemented by adding the present value, the last value (added twice), and the value previous to the last value and right shifting by two bits. Alternatively, instead of right shifting by two bits, the threshold to which the filtered output is compared to discriminate between positive and negative frequencies may be left shifted by 2 bits (equivalent to multiplying by 4). These filters average out the sample to sample variations, effectively nullifying the errors due to non-ideal duty cycle. In addition, their bandwidth is high enough so that they don't have the undesirable effect of filtering out the desired variations in frequency due to the actual modulation. Experimental results showed the addition of a first order sinc filter provided a 9 dB improvement in sensitivity.

The output of the filter FREQF is compared with threshold 710, which is a function of the high speed clock and the chosen IF frequency. The result of this comparison is used to determine if the data presently being received is a zero or one. Clock recovery circuit 710 uses the thresholded data to generate a data clock. There are many ways of recovering a clock that are well known to those skilled in the art, and the proper choice of clock recovery may depend on the data being transferred, for example Manchester encoded versus NRZ data.

Figure 8:
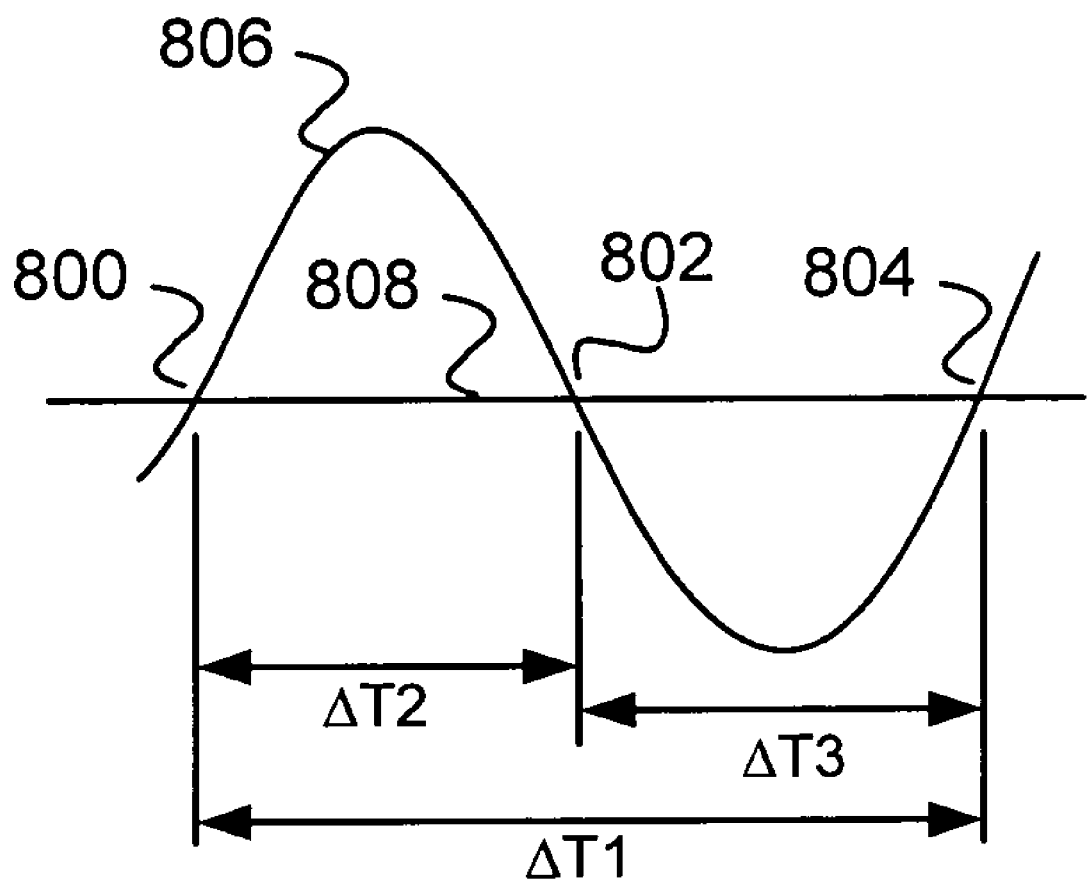
FIG. 8 is a plot of a single cycle of a frequency-modulated signal, defining various time intervals for one embodiment.

FIG. 8 is a plot of a single cycle of a frequency-modulated signal in one embodiment. In some embodiments, this signal is the input to comparator 700. In the example shown, the frequency detector measures the time between same-polarity edges (i.e. rising edge 800 to rising edge 804) of frequency modulated signal 806; that is, it provides a new period estimate (corresponding inversely to a frequency estimate) measurement once a cycle, as shown by reference $\Delta T_1$. In this case, a new time estimate is available at 804 representing the elapsed time between 800 and 804. In some embodiments, such a single-edged frequency detector includes a first counter that starts counting cycles of the high speed clock on a 0 to 1 transition of the quantized IF signal (e.g., a 0 to 1 transition that occurs when frequency modulated signal 806 crosses from below to above threshold 808) and stops counting cycles of the high speed clock on the next 0 to 1 transition (e.g., a 1 to 0 transition that occurs when frequency modulated signal 806 crosses from above to below threshold 808). In some embodiments, the frequency detector measures the time between each zero crossing (e.g., crossing of threshold 808 by frequency modulated signal 806); that is, it provides a new period measurement twice a cycle, as shown by references $\Delta T_2$ and $\Delta T_3$. In this case, a new time estimate is available at 802 representing the elapsed time between 800 and 802; an additional time estimate is available at 804 representing the elapsed time between 802 and 804. A frequency detector that provides a new frequency measurement on every edge is hereby termed a dual-edged frequency detector. In some embodiments, a dual-edged frequency detector includes a first counter that starts counting cycles of the high speed clock on a 0 to 1 transition of the quantized IF signal and stops counting cycles of the high speed clock on the next 1 to 0 transition. At this point the first counter value would be presented as the frequency detector output and a new count started with a second counter so that a new result is available at the next 0 to 1 transition.

Figure 9:
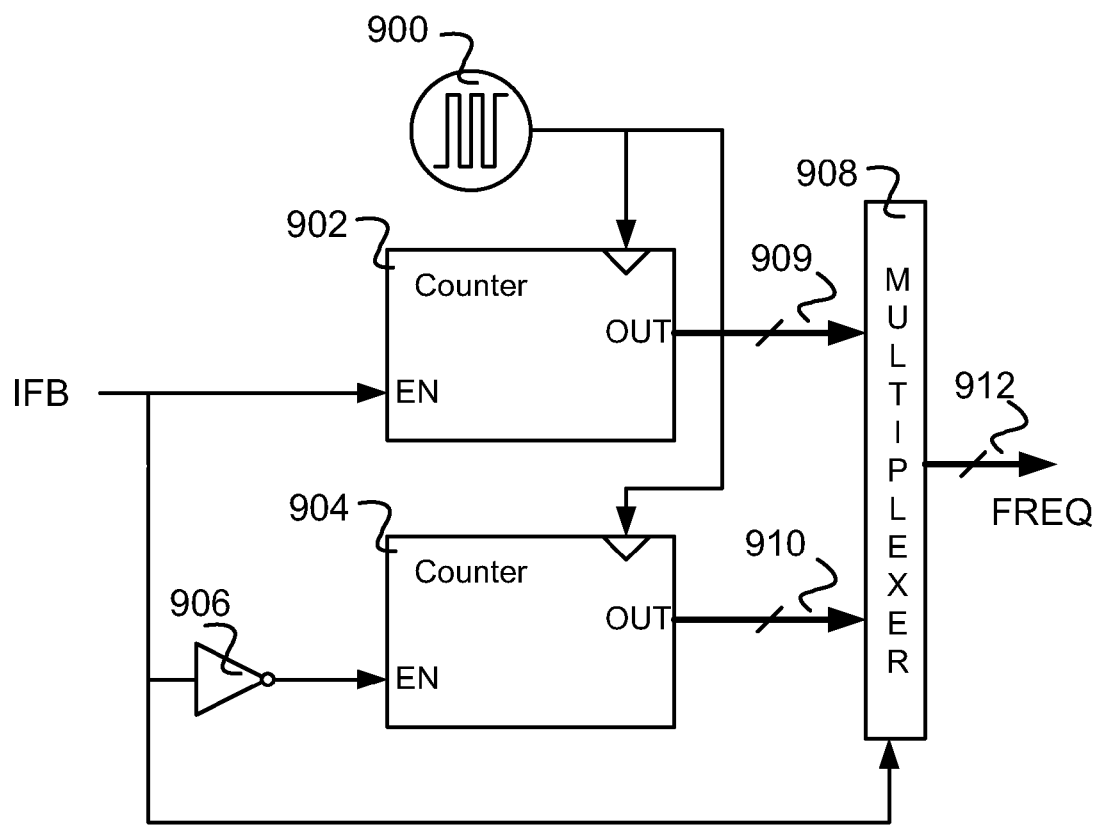
FIG. 9 is a block diagram illustrating an embodiment of a dual-edge frequency detector.

FIG. 9 is a block diagram illustrating an embodiment of a dual-edge frequency detector. In some embodiments, signal IFB is the output of 700 and the FREQ output is the input to 706. In the example shown, High speed clock 900 provides a signal to counters 902 and 904 that cause the counters to increment when they are enabled by the IFB input or the output of inverter 906. Generally, only one counter is incrementing at a time. For example, counters 902 and 904 are enabled when their respective enable inputs (EN) are high. Thus, counter 902 will increment when signal IFB is high, and counter 904 is cleared since it is not selected. When signal IFB falls, counter 902 halts counting and presents its output 909 to multiplexer 908 which selects 909 and presents it to output FREQ. In some embodiments, multiplexer 908 includes one or more latches to aid in sampling and presenting the data represented by 909 to output FREQ. After the output 909 is sampled by latches in the multiplexer, or the multiplexer is sampled by thresholding circuitry, counter 902 is cleared. Note that as signal IFB falls, the output of signal 906 rises, thereby enabling counter 904 to start counting cycles of high speed counter 900. When signal IFB rises, counter 904 halts counting and presents its output 910 to multiplexer 908 which selects 910 and presents it to output FREQ. In some embodiments, multiplexer 908 includes one or more latches to aid in sampling and presenting the data represented by 910 to output FREQ. After the output 910 is sampled by latches in the multiplexer, or the multiplexer is sampled by thresholding circuitry, counter 904 is cleared.

In some embodiments, a dual-edge frequency detector uses a single counter clocked by a high-speed clock to measure the period between IFB edge crossings. IFB is sampled by a D-type flip-flop to synchronize IFB to the high speed clock resulting in a signal $IFB_{SYNC}$. In some embodiments, two cascaded D-type flip-flops are used to prevent meta-stability. The counter is incremented by the high speed clock and is sampled by a first latch on the rising edge of $IFB_{SYNC}$ resulting in an output corresponding to the period between 1 to 0 and 0 to 1 transitions of IFB which is presented by a mux to the dual-edge frequency detector output. The counter is then sampled by a second latch on the falling edge of $IFB_{SYNC}$ resulting in an output corresponding to the period between 0 to 1 and 1 to 0 transitions of IFB which is presented by a mux to the dual-edge frequency detector output. In some embodiments, sequential outputs of the mux are subtracted from each other to account for the fact that the counter is not reset. Two's complement arithmetic aids in subtraction when the counter rolls over. In some embodiments, the counter is reset after each transition of $IFB_{SYNC}$ using an asynchronous clear input in the counter driven by a pulse generator that generates a pulse on every edge transition. In some embodiments, the counter is cleared after each transition of $IFB_{SYNC}$ using a synchronous clear input in the counter so that the counter is cleared in the same cycle that the latches sample the counter. In some embodiments, the counter is cleared after each transition of $IFB_{SYNC}$ using a synchronous clear input in the counter so that the counter is cleared in a cycle subsequent to the cycle during which the latches sample the counter.

Figure 10:
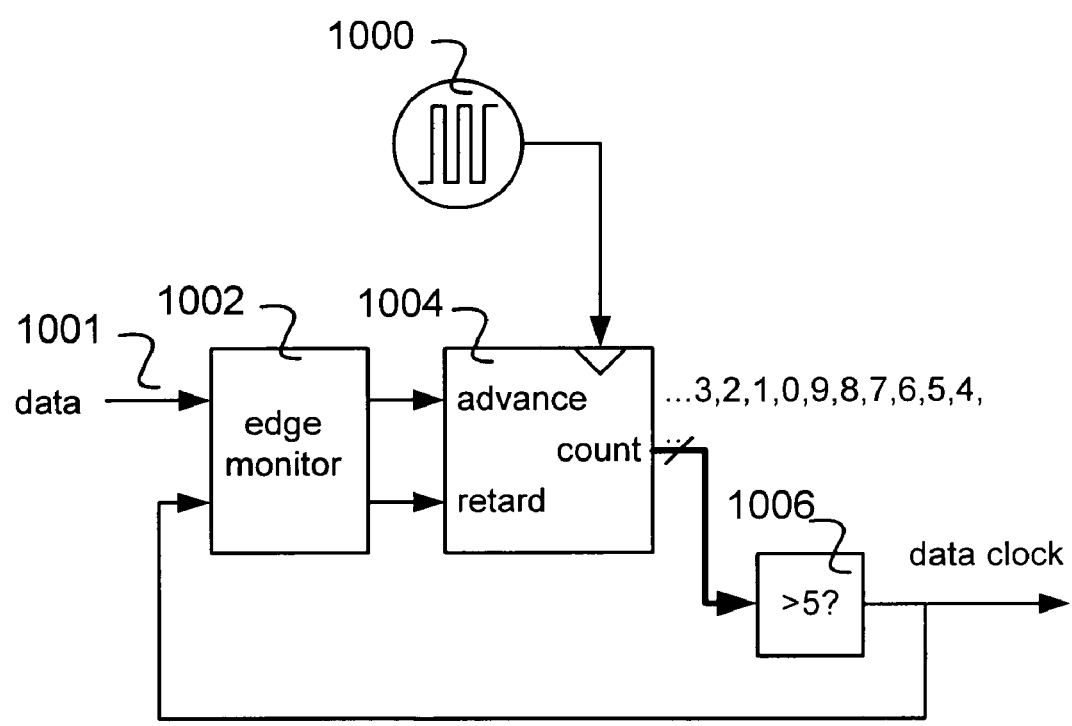
FIG. 10 is a block diagram illustrating an embodiment of a clock-recovery system.

FIG. 10 is a block diagram illustrating an embodiment of a clock-recovery system. In some embodiments, signal "data" is the output of thresholder 708 of FIG. 7A and "data clock" is the output of demodulator 504 in FIG. 5. In the example shown, the clock recovery system includes a smart counter 1004 running off of clock 1000 (e.g., a 20 MHz clock). Smart counter 1004 nominally counts from 9 down to 0 and then rolls over back to 9 to continue counting. The count output of 1004 is input to digital comparator 1006, which outputs high whenever count is greater than 5. The recovered data clock goes high when counter 1004 rolls over from 0 to 9 and remains high until counter 1004 reaches 5 after which point the recovered clock goes low (falling edge). Edge monitor 1002 monitors thresholded data 1001 looking for edges (high-to-low or low-to-high) and modifies the counting sequence of counter 1004 in order to drive the falling edge of the data clock to coincide with changes in the data. By doing this, the rising edge of the data clock is driven closer to the center of the bit period of thresholded data 1001. In some embodiments, the data rate is 2 Mcps or 2 Mbps. In some embOdiments, smart counter 1004 includes an advance directive which causes a counter to skip a 20 MHz count (i.e. count 9, 8, 7, 6, 5, 4, 3, 2, 1, 9, 8, . . . ); in this case the clock starts high at 9, switches low at the 5 to 4 transition and goes high again at the 1 to 9 transition. In some embodiments, smart counter 1004 further includes a retard directive which causes the counter to add a 20 MHz count (i.e. count 9, 8, 7, 6, 5, 4, 3, 2, 1, 0, 0, 9, 8, . . . ); in this case the clock starts high at 9, switches low at the 5 to 4 transition and goes high again at the 0 to 9 transition.

In some embodiments, the clock recovery is adjusted only in response to the temporal offset of just one data edge polarity with respect to the recovered clock. This technique is advantageous in situations where one polarity of the bit is intrinsically shorter than the other polarity of the bit as can be the case with a 2.5 MHz IF and deviation of +/−500 kHz. In various embodiments, a clock counter that runs at a frequency other than 20 MHz; a counter that cycles through some other range of numbers; a relative duty cycle that is non 50%; or a PLL-based clock recovery loop are included.

In some embodiments, hysteresis is added to the clock recovery feedback to provide improved clock recovery. Hysteresis is especially beneficial in the case where the bit or chip rate is very well controlled such as IEEE 802.15.4 which, effectively, specifies a chip rate equal to 2 Mcpc+/−40 ppm. Hysteresis is implemented by having a counter that counts how many advance directives minus retard directives it has received and provides an advance or retard command only after reaching a specified positive or negative sum of directives at which point the counter is reset. In this case, a retard directive cancels the effect of an advance directive, and vice versa.

In some embodiments, an interpolator is included between the thresholded output and the clock recovery system (e.g., between threshold 708 and clock recovery 710 of FIG. 7A). During demodulation of data, there will often be positive and negative frequency deviations averaged in each thresholder output since the zero or reference crossings of the IF are not synchronized to the changes in modulation frequency. This results in the frequency detector output presenting an output that is a mixture of both positive frequency and negative frequency deviations. Thus, sometimes the frequency detector output FREQF will be equal or nearly equal to the threshold (hereby termed indeterminate data). Interpolation helps ensure that the proper bit or chip value is sampled by the recovered clock. An interpolator provides interpolated data in these cases by starting an interpolation counter when the indeterminate data is detected, stopping the counter at the next FREQF output, and filling a shift register with a thresholded value of the FREQF output prior to the indeterminate data, and a thresholded data of the FREQF output subsequent to the indeterminate data, allocated approximately in equal proportion amongst the number of shift register bits determined by the interpolator counter; the prior value being placed in the bits nearest the output of the shift register. In some embodiments, the interpolator counter is incremented by the clock input to the clock-recovery system. For example, in some embodiments the thresholder decision point is a FREQF value of 60 and a ten-bit shift register is used for interpolation. During operation, a particular modulated input sequence first causes the FREQF output to have a value of 54, then an output having a value of 60. At this point, the interpolator starts counting 20 MHz clock cycles until the next FREQF output arrives which happens to have a value of 63; at this time the interpolator counter has counted to 6. Thresholding 54 yields a data value of 0 and thresholding 63 yields a data value of 1; thus the shift register is filled as follows 1, 1, 1, 0, 0, 0, W, X, Y, Z, where W, X, Y, Z represent the values of the thresholded FREQF values output before the FREQF value was 60. The shift register shifts out (to the clock recovery circuit) Z, followed by Y and so on. When not interpolating, the input to the shift register is the thresholded data. The output of the shift register is provided as the input to the clock recovery system. In various embodiments, an interpolator is included between the filter output and the thresholder input (e.g., between filter 706 and thresholder 708 of FIG. 7A); or, an interpolator is included between the frequency detector output and the filter input (e.g., between frequency detector 704 and filter 706 of FIG. 7A).

In various embodiments, the thresholder has a polarity so that longer times between IF crossings represents a binary 1; or the thresholder may have a polarity so that longer times between IF crossings represents a binary 0.

In various embodiments, the frequency demodulator is used in a wireless mesh network, a wireless network, for point to point communication, or for any other suitable application.

In some embodiments, the thresholding value is chosen based upon a calculation that provides an expected threshold value at the channel center given the frequency of the high speed clock and the intermediate frequency. In some embodiments, the calculated threshold value is adjusted to provide a threshold at a frequency slightly different than the channel center to provide better sensitivity by compensating for unequal number of IF cycles for high- and low-valued chips. In some embodiments, the thresholding value is adaptively determined by averaging the value of the frequency detector output in response to a stream of chips to determine a frequency output approximately midway between high- and low-valued chips; this can help compensate for an IF frequency that is different than expected due to frequency mismatch between the transmitter and the receiver crystal oscillators. In some embodiments, the thresholding value is adaptively determined by digitally filtering an average of the value of the frequency detector output in response to a stream of chips to determine a frequency output approximately midway between high- and low-valued chips. In some embodiments, the thresholding value is adaptively varied so that a different thresholding value is used for dual-edged frequency-detector outputs representing positive half cycles (0 to 1 to 1 to 0 on IFB) than the value used for negative half cycles (1 to 0 to 0 to 1 on IFB). Varying the thresholding value according to whether the edge is positive or negative may be used to compensate for non-50% duty cycle errors due to offset or flicker noise in place of or in combination with a digital filter.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for frequency demodulation of a signal comprising:

detecting a plurality of edge events in an intermediate-frequency signal, wherein the intermediate-frequency signal is generated by mixing a radio-frequency input signal and a local oscillator;

detecting in the intermediate-frequency signal said plurality of edge events;

determining a plurality of timing intervals between the plurality of edge events;

determining a data bit stream based at least in part on the plurality of timing intervals;

recovering a data-clock signal from the data bit stream, wherein the data-clock signal is synchronous with the data bit stream, wherein the local oscillator is asynchronous to the radio-frequency input signal, and wherein the local oscillator frequency is offset from the radio-frequency input signal.

2. A method as in claim 1, wherein the radio-frequency signal comprises a radio transmitted signal that has been received and converted to an electrical signal.

3. A method as in claim 1, wherein determining the data bit comprises sampling a demodulated signal at an edge of a data clock.

4. A method as in claim 3, wherein the data clock is generated based on a plurality of transitions in a frequency signal.

5. A method as in claim 4, wherein the frequency signal comprises a plurality of timing intervals between a plurality of pairs of edge events.

6. A method as in claim 5, wherein the frequency signal is filtered.

7. A method as in claim 4, wherein a transition in the frequency signal is based on an adjacent pair of timing intervals, where exactly one member of the pair is less than a threshold.

8. A method as in claim 1, wherein the first edge event and the second edge event correspond to edges of the same sign.

9. A method as in claim 1, wherein the first edge event and the second edge event correspond to edges of the opposite sign.

10. A method as in claim 1, wherein the timing interval is determined by counting a number of cycles of a high-speed oscillator occurring in a time elapsing between the first edge event and the second edge event.

11. A method as in claim 10, wherein a demodulated signal is high in the event that the frequency signal is greater than a count threshold.

12. A method as in claim 10, wherein a demodulated signal is high in the event that the frequency signal is less than a count threshold.

13. A method as in claim 1, wherein frequency demodulation for the signal is for a node of a mesh network.

14. A device for frequency demodulation comprising:
a frequency detector having an input and an output, wherein the frequency detector is configured to:
detect in the input signal a plurality of edge events, wherein input signal comprises an intermediate-frequency signal that is generated by mixing a radio-frequency input signal and a local oscillator;
determine a plurality of timing intervals between the plurality of edge events; and
a thresholder having an input, a threshold, and an output, wherein the input to the thresholder is coupled to the frequency detector output, wherein the output of the thresholder provides a demodulated signal comprising a data signal; and
a clock recoverer having an input and an output, wherein the input of the clock recoverer is coupled to the output of the thresholder, wherein a data-clock signal is recovered from the data signal, wherein the data-clock signal is synchronous with the data signal, wherein the local oscillator is asynchronous to the radio-frequency input signal, and wherein the local oscillator signal is offset from the radio frequency input signal.

15. A device as in claim 14, further including a frequency-modulated signal coupled to said frequency detector input, wherein the frequency detector comprises:
a high-speed clock; and
a counter having a first value at a first transition in the frequency-modulated signal and increments at each cycle of the high-speed clock, wherein the counter has a second value at a second transition in the frequency-modulated signal, wherein the second value is provided at the output of the frequency detector.

16. A device as in claim 4, wherein the radio-frequency signal is generated by an amplifier, wherein an antenna is coupled to an input of the amplifier.

17. A device as in claim 4, wherein the radio-frequency signal is provided by an antenna.

18. A device as in claim 14, wherein the frequency detector comprises a dual-edged frequency detector.

19. A device as in claim 14, wherein the input to the thresholder is coupled to the frequency detector output by coupling the output of the frequency detector to an input of a digital filter, and coupling an output of the digital filter to the input of the thresholder.

20. A device as in claim 19, wherein the digital filter comprises a sinc filter.

21. A device as in claim 14, wherein the clock recovery circuit includes an interpolator.

22. A device as in claim 14, wherein the frequency detector comprises a single-edged frequency detector.

23. The device as in claim 14, wherein the demodulated signal enables communication between a plurality of wireless mesh network nodes.

24. The device as in claim 14, wherein the device for frequency demodulation comprises a node of a mesh network.

25. A low power demodulator comprising:
an input signal having a frequency that is input to the low power demodulator;
a high speed clock circuit having an output clock signal;
a frequency detector having an output, said frequency detector coupled to receive said input signal and the output clock signal of said high speed clock, wherein the frequency detector is configured to:
detect in the input signal a plurality of edge events, wherein input signal comprises an intermediate-frequency signal that is generated by mixing a radio-frequency input signal and the high speed clock; and
determine a plurality of timing intervals between the plurality of edge events; and
a thresholder having a threshold and an output, said thresholder coupled to said frequency detector output output, wherein the output of the thresholder provides a demodulated signal comprising a data signal; and
a clock recoverer having an input and an output, wherein the input of the clock recoverer is coupled to the output of the thresholder, wherein a data-clock signal is recovered from the data signal, wherein the data-clock signal is synchronous with the data signal, wherein the high speed clock is asynchronous to the radio-frequency input signal, and wherein a frequency of the high speed clock is offset from the radio frequency input signal.

26. The low power demodulator as in claim 25, wherein said high speed clock operates at a frequency greater than 100 MHz.

27. The low power demodulator as in claim 25, wherein said input signal is IEEE 802.15.4 compliant.

28. The low power demodulator as in claim 25, wherein said modulated input signal is an IEEE 802.15.4 compliant signal frequency translated so the channel center frequency lies at 2.5 MHz.

29. The low power demodulator as in claim 25 wherein:
said input signal further includes modulated data; and
said thresholder output is representative of said modulated data.

30. The low power demodulator as in claim 29, wherein said modulated data is digital.

31. The low power demodulator as in claim 29, wherein said modulated data is modulated by one of the following: FSK, MSK, GFSK, OQPSK, OQPSK with half-sine pulse shaping, or 4-FSK.

32. The low power demodulator as in claim 25, wherein said frequency detector further includes:
a counter, said counter having a clock input and an enable input;

wherein said clock input is coupled to said high-speed clock and said enable input is coupled to said input signal.

33. The low power demodulator as in claim 25, wherein said frequency detector is a dual-edged frequency detector.

34. The low power demodulator as in claim 25, further comprising a digital filter having an input and an output, wherein the input to the thresholder is coupled to the frequency detector output by coupling the output of the frequency detector to the digital filter input, and coupling the output of the digital filter to the input of the thresholder.

35. The low power demodulator as in claim 34, wherein the digital filter comprises a sinc filter.

36. The low power demodulator as in claim 34, further including an interpolator.

37. The low power demodulator as in claim 25, wherein said input signal frequency has an average frequency, said average frequency substantially equal to 2.5 MHz.

38. The low power demodulator as in claim 28, wherein said clock recovery circuit has hysteresis.

39. The low power demodulator as in claim 25, wherein said threshold is generated adaptively.

40. The low power demodulator as in claim 25, wherein said threshold is determined at least in part by a frequency of the high speed clock and an intermediate frequency.

41. The low power demodulator as in claim 25, wherein the low power demodulator comprises a node of a mesh network.

* * * * *